United States Patent [19]

Karsay et al.

[11] 4,043,822
[45] Aug. 23, 1977

[54] TREATMENT OF WATER-SOLUBLE METAL SULFATE RESIDUES

[75] Inventors: Bela I. Karsay, DeWitt; Robert L. Sturtevant, Baldwinsville, both of N.Y.

[73] Assignee: Allied Chemical Corporation, Morristown, N.J.

[21] Appl. No.: 633,775

[22] Filed: Nov. 20, 1975

[51] Int. Cl.$^2$ .............. C04B 33/04; C01B 17/50; C01B 17/72; C01B 17/90

[52] U.S. Cl. .................... 106/70; 423/274; 423/531; 423/541 A; 423/543; 423/DIG. 3

[58] Field of Search ............... 423/539, 539 A, 540, 423/541, 541 A, 543, 511, 525, 526, 527, 529, 530, 531, 561 R, 561 A, 562, 565, 566, 659 A, 8, 274; 106/70, 304, 308 B; 252/189

[56] References Cited

U.S. PATENT DOCUMENTS

| 238,980 | 3/1881 | Spence | 106/70 |
|---|---|---|---|
| 455,611 | 7/1891 | Emanuel | 423/128 |
| 463,143 | 11/1891 | Emanuel | 423/565 |
| 3,383,170 | 5/1968 | Furkert et al. | 423/541 A |
| 3,427,126 | 2/1969 | Cambi | 423/565 |
| 3,450,523 | 6/1969 | Socolesu | 423/530 |
| 3,667,908 | 6/1972 | Torrence | 423/539 |
| 3,810,968 | 5/1974 | Renault et al. | 423/541 A |
| 3,833,715 | 9/1974 | Deschamps et al. | 423/541 A |

FOREIGN PATENT DOCUMENTS

| 628,731 | 6/1963 | Belgium | 423/541 |
| 1,181,179 | 11/1964 | Germany | 423/541 |

OTHER PUBLICATIONS

Nair et al., Reduction of Sulfate by Sulfur in a Vacuum, Current Science, vol. 39, No. 14, July 1970, p. 322.
Beck et al., Alien Property Custodian Serial No. 393,258, July 13, 1943.

Primary Examiner—O. R. Vertiz
Assistant Examiner—Gary P. Straub
Attorney, Agent, or Firm—Gerhard H. Fuchs

[57] ABSTRACT

Process for transforming water-soluble metal sulfate residue obtained from spent sulfuric acid containing inorganic impurities, such as pickle liquors or acid wastes from hydrometallurgical processes, into substantially water-insoluble form suitable for disposal which comprises introducing the residue into a pool of molten sulfur maintained at temperature of at least about 250° C. to thereby generate a gaseous stream comprising sulfur dioxide and to transform the metal sulfate residue into corresponding reduction products, and recovering sulfur dioxide and reduction products associated with sulfur in solid form suitable for disposal.

9 Claims, 2 Drawing Figures

TREATMENT OF WATER-SOLUBLE METAL SULFATE RESIDUES

BACKGROUND OF THE INVENTION

This invention relates to transformation of water-soluble metal sulfate residue obtained from spent sulfuric acid containing inorganic impurities into substantially water-insoluble solid form suitable for disposal.

In several industrial processes there are formed large quantities of by-product spent sulfuric acids containing dissolved metal sulfates. These acids, for example, include those obtained from hydrometallurgical leaching operations, from metal pickling operations such as steel pickling, from the process of making titanium dioxide pigment from titaniferous materials such as ilmenite and ilmenite slag, and the like. Such spent acids pose serious disposal problems.

It is already known to recover sulfuric acid from spent sulfuric acid containing metal sulfates. For example, F. J. Bartholomew describes a method for recovering sulfuric acid from spent sulfuric acid generated in steel pickling and titanium pigment production involving concentrating the acid by evaporization of water therefrom under crystallization of sulfate salts, and separation of these salts to recover acid for reuse. Bartholomew then goes further and recovers sulfur values from these precipitated salts by mixing them with coal, followed by heating to effect reduction of the sulfate to sulfur dioxide, under concomitant formation of metal oxides. [Ind. Eng. Chem. 44, p. 541 et seq. (1952)].

It is also known that various sulfates can be reacted with sulfur in dry state at suitable temperature to form sulfides and/or other reduction products [K. Bruckner, Ber. Wien. Adad. 114 IIa (1905) 1151/66; Monatsh. 27(1906) 40/58, 199/204].

Numerous processes for recovering sulfuric acid from metal sulfate-containing spent acids have been proposed involving evaporization of water from or distillation of the sulfuric acid component of such spent acids (see, e.g., U.S. Pat. No. 3,713,786). These evaporative processes, however, generally leave a residue of water-soluble metal sulfate, for which there are no satisfactory means of disposal.

It is an object of the present invention to provide a process for tranformation of water-soluble metal sulfate residue obtained from spent sulfuric acid containing inorganic impurities into a substantially water insoluble residue suitable for disposal without threat to the environment.

SUMMARY OF THE INVENTION

In accordance with the present invention, there is provided a process for transforming water-soluble metal sulfate residue obtained from spent sulfuric acid into a substantially water-insoluble agglomerated residue, which comprises introducing said water-soluble metal sulfate residue into a pool of molten sulfur maintained at temperature of at least about 250° C. to thereby generate a gaseous stream comprising sulfur dioxide and to transform metal sulfate contained in the residue into corresponding reduction products, recovering sulfur dioxide and separating reduction product from the pool of molten sulfur to recover agglomerated reduction product.

Under the conditions of our process the heavy metal sulfates, such as the sulfates of iron (both ferrous and ferric) antimony, bismuth, zinc, cadmium, lead, chromium, manganese, nickel and copper, and perhaps titanium and vanadium, all of which are quite objectionable from a pollution point of view, will generally be reduced to the corresponding insoluble sulfides. The sulfates of the alkali metals, of the alkaline earth metals, as well as aluminum sulfate, which are less objectionable from a pollution point of view, may under these conditions be reduced to sulfites, sulfides, polysulfides and thiosulfates. The products of the invention process are hereinafter sometimes collectively referred to as reduction products.

In our process the pool of molten sulfur furnishes reductant for the metal sulfates as well as the reaction medium for carrying out this reduction. The process is capable of handling a wide variety of metal sulfates obtained from spent sulfuric acid containing such metal sulfates.

The reduction reaction between the metal sulfates and the sulfur is endothermic. Heat must be supplied in order to sustain it. This can be conveniently accomplished by heating the pool of molten sulfur contained in a reactor wherein the reaction is conducted, as by indirectly contacting it with a heat exchange medium, e.g. by providing a jacketed reactor, by providing heating coils within the reactor, by circulating a stream of sulfur from the pool through an externally located heat exchanger, or by introducing oxygen or oxygen-containing gas directly into the pool of molten sulfur within the reactor to generate heat by combustion of sulfur therein.

Reaction between the metal sulfate residue and the liquid sulfur results in formation of reduction product such as sulfides, polysulfides and sulfites, as above described, which accumulate in the pool of molten sulfur in finely divided form and, if not removed therefrom, would transform the pool of molten sulfur into an intractible slurry. In order to keep the concentration of these reduction products at manageable levels, say below about 20 percent by weight of the sulfur, desirably part of the molten sulfur which furnishes the reaction medium is continuously or intermittently purged. Solid reduction products, as above described (together with metal oxides which may also be formed in the event heating of the pool of molten sulfur is effected by blowing air or oxygen directly into it) can be removed from the purge stream by any convenient method, for example by sedimentation of filtration, and the purge stream from which the reduction products (and oxides) have been so removed can be returned to the liquid reaction medium.

The reduction product so separated from the liquid sulfur contains sufficient elemental sulfur to coat and bind together the individual particles of reduction product so that upon solidification of the elemental sulfur an easily handled, generally dust-free solid agglomerate is obtained. The coating action of the sulfur reduces tendency to leach of soluble components of reduction products, that is to say of those components of the reduction product which are not present in the form of insoluble sulfides, perhaps including some unreacted sulfates, so that these agglomerates are suitable for storage and disposal without danger to the environment.

BRIEF DESCRIPTION OF THE DRAWINGS

In the drawings, wherein like reference numerals denote like apparatus components.

In FIG. 1, an embodiment is illustrated wherein metal sulfate residue is reduced in a pool of molten sulfur maintained in a reactor wherein a reduction product-containing purge stream is withdrawn from the reactor, is passed through a filter to remove the reduction product therefrom, and is then passed through a fired heater to maintain the pool of molten sulfur in the reactor at desired temperature.

FIG. 2 illustrates another specific embodiment of the process of the present invention wherein a stream of sulfur is withdrawn from the pool of molten sulfur in the reactor and is passed through a filter to remove reduction product (and metal oxide, if be formed) therefrom, and the filtered stream is returned to the reactor. In that embodiment oxygen-containing gas, such as air, air enriched with oxygen or pure oxygen is blown into the reactor itself to generate heat by burning sulfur directly in the reactor.

Figure 1:
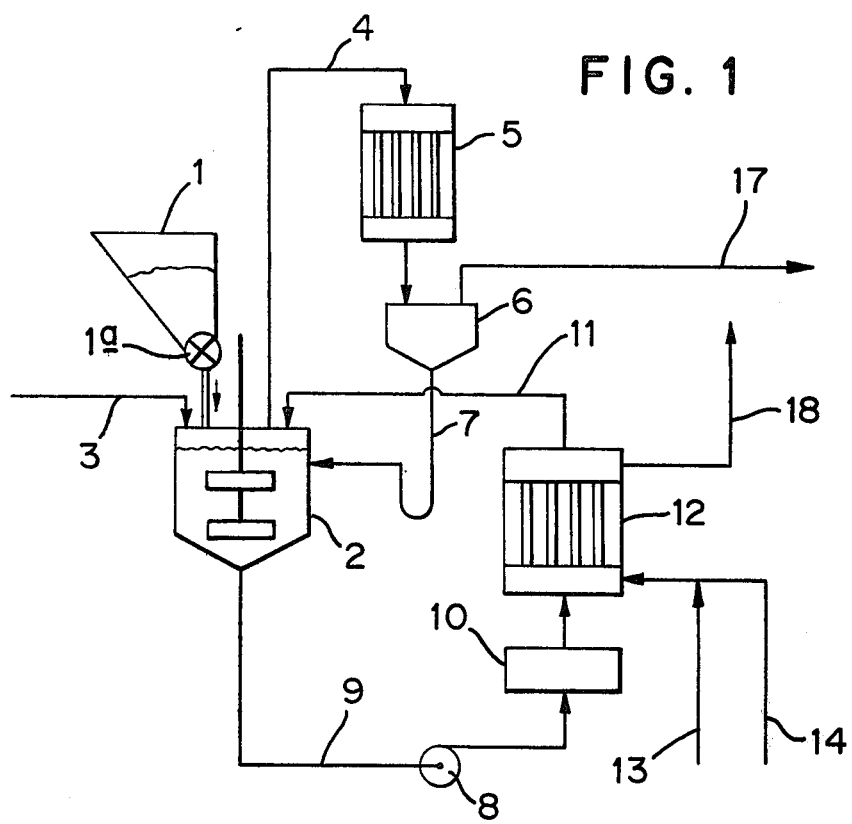
FIGS. 1 and 2 are flow diagrams illustrating specific embodiments of the process of the present invention.

DETAILED DESCRIPTION OF THE INVENTION, OF THE PREFERRED EMBODIMENTS, AND OF THE BEST MODE CONTEMPLATED FOR ITS PRACTICE

In the process of the present invention, the pool of molten sulfur wherein reduction of the metal sulfate residue is effected is held in a reaction vessel which may be designed for operation under superatmospheric pressure, if desired, which reaction vessel is constructed of suitable corrosion resistant material, such as stainless steel, or which is lined with acid and heat resistant brick. The reactor desirably is equipped with means for agitation, for example a paddle agitator. Other meams for agitation, such as circulating pumps, may be employed with equally satisfactory results.

The pool of molten sulfur in the reactor is maintained at temperature above about 250° C., preferably above about 300° C., in order to obtain commercially acceptable decomposition rates and to operate within reasonably low viscosity range of the sulfur. Viscosity of liquid sulfur undergoes significant changes with temperature variations. Viscosity of purified sulfur at 120° C. is about 11 centipoises. On further heating the viscosity drops to about 6.7 centipoises at about 150° C., and then begins to rise to about 30 centipoises at 160° C., reaching a maximum of about 93,000 centipoises at 187° C. Above this temperature, the viscosity gradually drops off again to about 2,000 centipoises at 360° C. In order to maintain the sulfur in the pool of molten sulfur in the reactor at sufficiently low viscosity to permit thorough agitation, operating temperatures above about 300° C. are preferred. Most preferred are operating temperatures between about 350° C. and the boiling point of the sulfur at the chosen operating pressure. Operation at these temperatures permits good dispersion of the metal sulfate residue in the pool of molten sulfur. There is no upper limit on the temperature of the pool of molten sulfur other than that dictated by the requirement that the sulfur be in liquid form.

At most desirable operating temperatures, that is to say above about 350° C., the vapor pressure of sulfur is appreciable so that the gas phase above the molten sulfur in the reactor contains an appreciable amount of sulfur vapor, which can be recovered and rerouted to the pool of molten sulfur in the reactor by passing the gaseous stream evolved from the reactor through a reflux condensor wherein it is cooled to temperature above the melting point of sulfur but below the point where viscosity of molten sulfur rapidly increases (below about 160° C.), suitably to temperature between about 120° and 150° C., preferably between about 125° and 135° C., to thereby insure high degree of sulfur removal from the gas by condensation.

The relatively high vaporization rate of sulfur at preferred operating temperatures and the relatively low temperature to which the sulfur is cooled in the reflux condensor prior to return to the pool of molten sulfur in the reactor result in removal of considerable amount of heat from the pool of molten sulfur in the reactor. The vaporization rate of the sulfur, and concomitant heat loss, can be reduced by conducting the reaction under superatmospheric pressure. Thus, although, the invention process can be effectively conducted under atmospheric pressure, it is preferably conducted under superatmospheric pressure, suitably in the order of about 1 to 100 atmospheres, preferably about 2 to 10 atmospheres. Superatmospheric pressure not only reduces the vaporization rate of the sulfur, but also increases the boiling point of the sulfur in the reactor, and thus permits conducting the reaction substantially in liquid phase at temperatures higher than otherwise possible.

The metal sulfate residue can be fed to the pool of molten sulfur in the reactor in many ways, such as by feeding it, continuously or intermittently, onto or below the surface of the pool of molten sulfur, as by means of a screw conveyor or similar suitable conveying device, under sufficient agitation of the pool.

Reduction of metal sulfates in accordance with the process of the present invention results in accumulation of solid reduction product in the pool of molten sulfur. Unless such solid reduction product is removed from the pool of molten sulfur, the sulfur would turn into a thick slurry which could not be agitated. The reduction product can be removed from the sulfur by any convenient method, such as sedimentation or filtration, for example.

The gas stream resulting from reduction of metal sulfate residue in accordance with the present invention principally contains sulfur dioxide and vaporous elemental sulfur, and usually some water if the metal sulfate residue contained residual sulfuric acid. If the gas stream is to be used, e.g. for making sulfuric acid in a contact plant, the sulfur and water are desirably removed therefrom before further processing. To that end, this gas may first be passed through a first condenser, which is a reflux condenser, to condense vaporous elemental sulfur — together with sulfuric acid, if any, which may have been evaporated in the reactor. The condensate may be separated and returned to the pool of molten sulfur in the reactor.

The gaseous stream comprising sulfur dioxide and water from which elemental sulfur has been thus removed may then optionally be passed through a second condenser, wherein it is cooled to a temperature between the freezing point and the boiling point of the water at prevailing operating pressures, usually between about 1° C. and about 99° C.; conveniently between about ambient (about 20° C.) and 80° C. to condense out water.

The sulfur dioxide-containing gas stream from which water has been condensed can be used, perhaps after additional drying as by contacting it with strong sulfuric acid and, optionally dilution with air or oxygen to furnish sulfur dioxide-containing feed gas for a contact sulfuric acid plant. Alternatively, the sulfur dioxide-containing gas stream can be used in any other process or chemical operation requiring strong sulfur dioxide, or for making liquid sulfur dioxide.

Design, construction and operation of apparatus for carrying out the process of the present invention is well within the skill of an ordinary, skilled practitioner, features of apparatus design and construction not being part of the present invention.

EXAMPLE

This example illustrates a process for reducing metal sulfate residue to make a sulfur dioxide-containing gas stream and to convert the substantially water soluble metal sulfate residue into substantially water insoluble solid reduction product agglomerate comprising metal sulfides and sulfur, which process incorporates a preferred embodiment of the present invention.

With reference to FIG. 1, equipment employed includes reactor 2, sulfur condenser 5, sulfur separator 6, sulfur return line 7 equipped with lute, sulfur filter pump 8, sulfur filter 10 and sulfur heater 12, together with associated lines, ducts and other auxiliary equipment. Equipment employed is constructed of corrosion resistant material.

The metal sulfate residue to be reduced is obtained by evaporating spent sulfuric acid originating from the process of making titanium dioxide pigment from ilmenite slag and crystallization of metal sulfate crystalls therefrom, having the following approximate composition (acid and water-free basis):

Table I

|  | percent by weight |
|---|---|
| $FeSO_4$ | 32 |
| $MgSO_4$ | 25 |
| $Al_2(SO_4)_3$ | 33 |
| $TiOSO_4$ | 7 |
| $VOSO_4$ | 1 |
| $Cr_2(SO_4)_3$ | 1 |
| $MnSO_4$ | 1 |
| Total | 100 percent |

Reactor 2 is a closed pressure reaction vessel, agitator equipped and internally baffled. It contains a pool of molten sulfur maintained at temperature of about 370° C. The metal sulfate residue as above described is introduced into the pool of molten sulfur in reactor 2 from metal sulfate feed bin 1 by means of metal sulfate feeder 1a. Molten sulfur is fed to reactor 2 by means of line 3 in amount sufficient to maintain constant liquid level within the reactor 2. In reactor 2 the metal sulfate components of the metal sulfate residue are reduced under formation of sulfur dioxide.

Gaseous products leaving reactor 2 are passed via line 4 through sulfur condenser 5, which is a shell-and-tube type heat exchanger, wherein the gas stream is cooled to about 140° C. to condense sulfur. The gaseous stream from which sulfur has been condensed and the condensed sulfur are permitted to separate in sulfur separator 6, and the condensed sulfur is returned to reactor 2 via sulfur return line 7 which forms a lute to prevent blow-back of liquid sulfur from the reactor. Sulfur separator 6 is an empty vessel with a bottom outlet for liquid sulfur and a top outlet for the gas stream.

The sulfur dioxide-containing gas stream from which sulfur has been condensed is withdrawn from the system through sulfur dioxide line 17. It may be used, after drying, as feedstock in a sulfuric acid plant for oxidation to sulfur trioxide and absorption in sulfuric acid to form further sulfuric acid.

Molten sulfur is withdrawn from reactor 2 via line 9 by means of sulfur filter pump 8, is passed through filter 10 wherein reduction products are separated from the sulfur stream. The filtered sulfur stream is then passed through sulfur heater 12, which is a shell-and-tube type heat exchanger, to be heated therein with products of combustion generated by burning fuel (fed through fuel line 13) in air (fed through air feed line 14) is sulfur heater 12. The liquid sulfur is brought to temperature in the order of about 425° C. and is returned to reactor 2 via line 11. Products of combustion of the fuel formed in sulfur heater 12 are exhausted to the atmosphere through stack 18.

Figure 2:
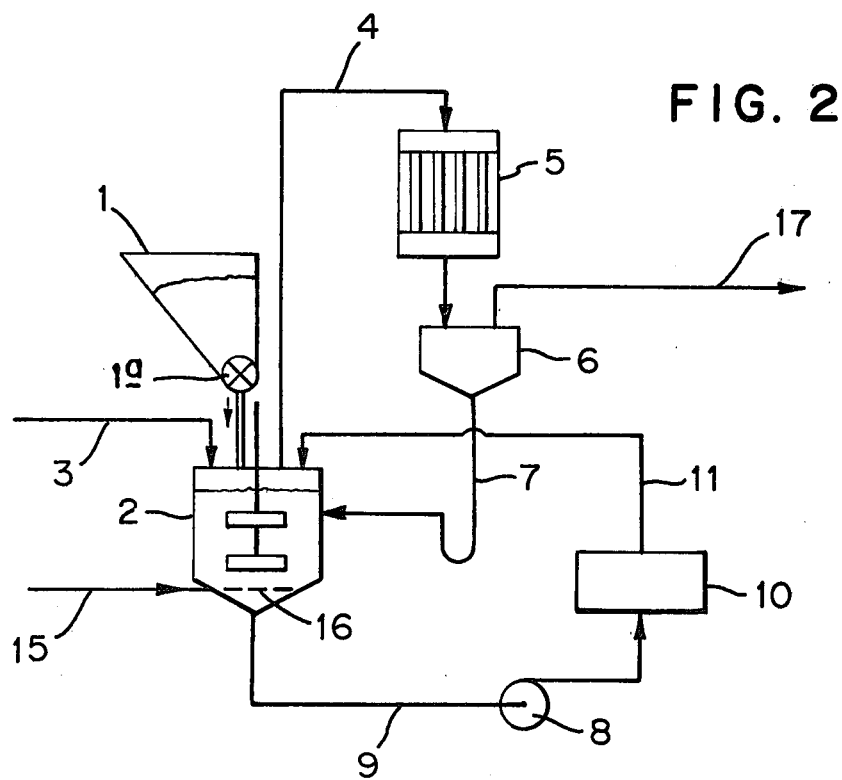

With reference to FIG. 2, there is illustrated another embodiment of the process of the present invention. Heat is supplied by burning sulfur directly in reactor 2, by feeding oxygen or oxygen-containing gas via oxygen feed line 15 by means of sparger 16 directly into the pool of molten sulfur maintained in reactor 2. The embodiment shown in FIG. 2 therefore eliminates the need for sulfur heater 12 and associated equipment. In other respects the process operates under conditions and in the manner above described in connection with discussion of the embodiment shown in FIG. 1.

In each of the embodiments illustrated by FIGS. 1 and 2 reduction products comprising metal sulfides are recovered as filter cake from filter 10. The recovered filter cake is impregnated with sulfur. It can, after cooling, be stored without dusting problems because the sulfur binds the reduction product particles together, forming solid chunks which are not subject to leaching and which can be stored and disposed of without danger to the environment. If desired, the reduction product containing sulfur can be formed into blocks, or ground to finer particle size, to facilitate handling, storage or disposal. Also, metal values can be recovered from reduction product by known methods, e.g., by roasting to form oxides and further processing of the oxides in known manner to obtain the pure metals or desirable compounds thereof.

Since various changes may be made in carrying out the process of the present invention without departing from its scope and essential characteristics, it is intended that all matter contained in the above description shall be interpreted as illustrative only, the invention being limited solely by the appended claims.

We claim:

1. Process for transforming solid watersoluble metal sulfate residue obtained from spent sulfuric acid into a substantially water-insoluble agglomerated reduction product, which comprises introducing said metal sulfate residue into a pool of molten sulfur maintained at temperature of at least about 250° C, wherein said pool of molten sulfur furnishes both the reaction medium as well as the reductant for said metal sulfate residue, to thereby generate a gaseous stream comprising sulfur dioxide and to transform the metal sulfate residue into a corresponding reduction product, recovering sulfur dioxide and separating reduction product from the pool of molten sulfur to recover agglomerated reduction product containing sufficient elemental sulfur to bind together the reduction product.

2. The process of claim 1 additionally comprising the step of cooling said gaseous stream comprising sulfur dioxide to temperature above the melting point of the sulfur but below about 160° C. to condense elemental sulfur therefrom, separating said condensed elemental sulfur and returning it to said pool of molten sulfur.

3. The process of claim 1 wherein said pool of molten sulfur is maintained at temperature above about 300° C.

4. The process of claim 1 conducted under superatmospheric pressure between about 1 and about 100 atmospheres.

5. The process of claim 1 wherein the metal sulfate residue is obtained from spent sulfuric acid from a steel pickling operation.

6. The process of claim 1 wherein the metal sulfate residue is obtained from spent sulfuric acid from the process for making titanium dioxide from titaniferous material.

7. The process of claim 6 wherein the pool of molten sulfur is maintained at temperature above about 300° C.

8. The process of claim 7 with the additional step of cooling said stream comprising sulfur dioxide to temperature above the melting point of the sulfur but below about 160° C. to condense elemental sulfur therefrom, separating said condensed elemental sulfur and returning it to said pool of molten sulfur.

9. The process of claim 8 wherein the pool of molten sulfur and the metal sulfate residue are contacted under superatmospheric pressure of between about 1 and about 100 atmospheres.

* * * * *